(12) United States Patent
Worsley

(10) Patent No.: US 6,593,006 B2
(45) Date of Patent: Jul. 15, 2003

(54) DECORATIVE WOODEN ARTICLES AND METHOD OF FABRICATING

(75) Inventor: David Russell Worsley, Lamar, MO (US)

(73) Assignee: O'Sullivan Industries, Inc., Lamar, MO (US)

( * ) Notice: Subject to any disclaimer, the term of this patent is extended or adjusted under 35 U.S.C. 154(b) by 0 days.

(21) Appl. No.: 09/964,715

(22) Filed: Sep. 27, 2001

(65) Prior Publication Data

US 2003/0059639 A1 Mar. 27, 2003

(51) Int. Cl.$^7$ ................................................ B32B 21/04
(52) U.S. Cl. .................. 428/537.1; 428/537.5; 428/535; 428/536; 427/461; 427/474; 427/485; 427/487; 427/500; 427/506; 427/514; 427/517; 427/520
(58) Field of Search ..................... 428/537.5, 535, 428/536, 537.1; 427/461, 474, 485, 487, 500, 506, 514, 517, 520

(56) References Cited

U.S. PATENT DOCUMENTS

| | | | |
|---|---|---|---|
| 3,899,611 A | 8/1975 | Hall | 427/488 |
| 4,129,488 A | 12/1978 | McGinniss | 525/438 |
| 4,163,810 A | 8/1979 | McGinniss | 427/514 |
| 5,824,373 A | * 10/1998 | Biller | 427/474 |
| 5,922,473 A | 7/1999 | Muthiah et al. | 428/481 |
| 6,017,640 A | 1/2000 | Muthiah et al. | 428/514 |
| 6,077,608 A | 6/2000 | Barkac et al. | 428/411.1 |

FOREIGN PATENT DOCUMENTS

| | | |
|---|---|---|
| JP | 360035273 A | 8/1985 |
| JP | 62227474 | 10/1987 |
| JP | 2000071360 | 3/2000 |

* cited by examiner

Primary Examiner—Leszek Kiliman
(74) Attorney, Agent, or Firm—Armstrong Teasdale LLP

(57) ABSTRACT

A method of fabricating a decorative wood article includes the steps of applying a decorative overlay onto at least one surface of a wood article, applying a radiation curable powder coating onto the outer surface of the overlay, heating the applied radiation curable powder coating at a temperature sufficient to melt and flow the powder coating, and exposing the applied powder coating to radiation energy to cure the powder coating and form a film on the outer surface of the decorative overlay.

18 Claims, 1 Drawing Sheet

DECORATIVE WOODEN ARTICLES AND METHOD OF FABRICATING

BACKGROUND OF THE INVENTION

This invention relates generally to decorative wood articles and more particularly methods of fabricating decorative wood articles using powder coatings to reduce volatile organic emissions.

Powder coatings are being used to coat more articles in industrial applications because powder coatings are more environmentally friendly than liquid coatings. Powder coatings are virtually free of volatile organic compounds (VOC) that are present in most liquid coatings. Consequently, the solvent or VOC emissions problems associated with liquid coatings are eliminated by powder coatings which enables industrial business to meet federal and local air pollution regulations.

Despite their many advantages, powder coatings are typically not used to coat heat sensitive substrates, such as wood and plastic, because of the high temperatures generally needed to cure powder coatings.

It would be desirable to provide a method of fabricating a decorative wood article utilizing powder coatings. Further it would be desirable to provide a method of fabricating a decorative wood article that included a heat sensitive decorative overlay on the surface of the wood utilizing powder coatings.

BRIEF DESCRIPTION OF THE INVENTION

In an exemplary embodiment of the present invention, a method of fabricating a decorative wood article utilizes radiation curable powder coatings to reduce VOC emissions. The method includes applying a decorative overlay onto a surface of a wood article, such as natural wood, particleboard, fiberboard, or medium density fiberboard, and applying a powder coating onto the outer surface of the overlay. The wood article can be heated prior to the application of the powder coating to enhance the electrostatic attraction of the powder coating to the wood article. After application of the powder coating onto the surface of the decorative overlay, the powder coating is melted by heating the coating. Heating of the coating is accomplished, for example, with an infrared (IR) heater, a convection heater, or a combination of convection heat and IR. The temperature used is sufficient to melt and flow the powder coating while not degrading the wood substrate and/or the decorative overlay. The powder coating is then exposed to radiation energy to cure the powder coating and form a film on the top surface of the decorative overlay.

The above described method provides for the fabrication of a decorative wood article that includes a decorative overlay applied to the surface and that utilizes a radiation curable powder coating. The radiation curable powder coating produces virtually no VOC emissions during the application and curing process. The powder coating application and curing steps do not degrade the wood substrate nor the decorative overlay.

DETAILED DESCRIPTION OF THE INVENTION

Figure 1:
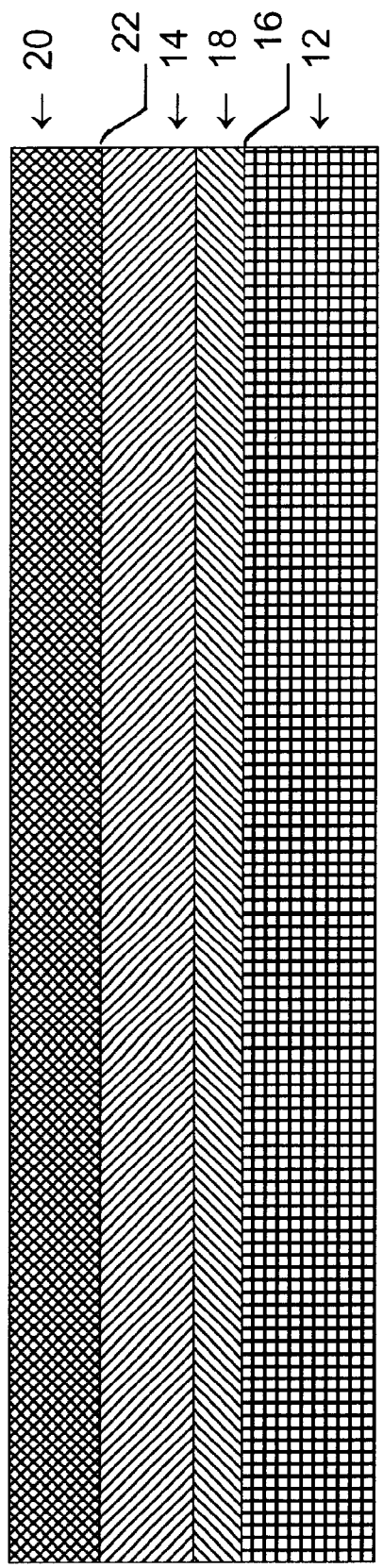
FIG. 1 is schematic cross sectional view of a decorative wood article in accordance with an embodiment of the present invention.

FIG. 1 is schematic cross sectional view of a decorative wood article 10 fabricated in accordance with an exemplary embodiment of the present invention. Decorative wood article 10 includes a wood substrate 12 with a decorative overlay 14 adhered to an outer surface 16 of substrate 12 with an adhesive 18. An outer layer 20 is formed by a radiation curable powder coating applied to an outer surface 22 of decorative overlay 14. As used herein, the expression "radiation curable" means cure resulting from actinic radiation such as ultraviolet (UV) light, or particle radiation such as an electron beam.

Suitable materials for wood substrate 12 include, but not limited to, natural wood, particleboard, fiberboard, medium density fiberboard, and the like. Decorative wood article 10 can be any shape. FIG. 1 shows a cross section of a flat panel or sheet. In alternate embodiments, decorative wood article 10 has a shape other than flat. It should be noted that the shape of decorative wood article 10 is limited only by the ability to expose the radiation curable powder coating that forms outer layer 20 to radiation energy.

In another embodiment, the edges of decorative article 10 shown in FIG. 1 also contain a decorative layer attached by an adhesive and an outer layer formed by a radiation curable powder coating applied to the outer surface of the decorative layer.

Decorative overlay 14 is formed from paper, wood veneer, vinyl, ink, foil, heat transfer foil, or the like. Decorative overlay 14 is laminated to at least one outer surface 16 of wood substrate 12. Adhesive 18 adheres overlay 14 to outer surface 16 of wood substrate 12. Any suitable adhesive can be used in the practice of the invention, for example, thermosetting adhesives, thermoplastic adhesives, pressure sensitive adhesives, and the like. In one embodiment, a urea formaldehyde adhesive, Synteko 1205, commercially available from Akzo Nobel Coatings, Casco Products Group, High Point, N.C., is used together with Casco Products hardeners 2547 or 9546. Other suitable adhesives are commercially available from Western Adhesives, Kansas City, Mo. Thermosetting adhesives can be cured by any suitable method, for example, heating in a convection oven, heating in an IR oven, and/or exposure to electron beam radiation. Decorative overlay 14 can be laminated to substrate 12 by any suitable means, for example, a vacuum press, a laminating roll, a platten press, and a membraneless press.

Outer coating layer 20 is formed from a radiation curable powder coating. The powder coating is applied to outer surface 22 of decorative overlay 14 by known electrostatic spray techniques including corona discharge electrostatic spraying and tribocharged electrostatic spraying. The electrical conductivity of wood substrate 12 is dependent on the moisture content and the type of the wood substrate. To enhance the electrostatic attraction of the powder coating to outer surface 22 of decorative overlay 14, wood article 10 can be heated prior to the application of the radiation curable powder coating. Depending on the type of wood, wood substrate 12 can be heated, in one embodiment, to between about 140° F. to about 170° F. Wood substrates can degrade if exposed to temperatures greater than 250° F. In another embodiment, wood substrate 12 is heated at a temperature less than about 250° F.

The powder coating, in one embodiment, is a clear radiation curable powder coating. In other exemplary embodiments, the radiation curable powder coating is tinted and/or contains pigment. Additionally, the powder coating has a relatively low melting point which is below the degradation temperature of the wood substrate. Suitable radiation curable powder coatings include, but are not limited to, acrylics, polyesters, and epoxy-acrylics. Suitable radiation curable powder coatings are commercially available from Valspar Corporation, Morton, H. B. Fuller, and Govesan.

After application of the radiation curable powder coating to outer surface 22 of decorative overlay 14, the applied powder coating is heated to melt and flow the powder into a continuous molten film. Heating can be accomplished in infrared (IR) and/or convection ovens. The objective of this step is to melt and flow the powder coating and not to cure the powder coating; therefore, relatively low temperatures are used, for example from about 150° F. to about 250° F. As explained above, temperatures greater than 250° F. can degrade wood substrate 12 and decorative overlay 14.

The flowed out powder coating is then cured by exposure to radiation energy, for example, UV light and/or electron beam radiation. In one exemplary embodiment, the flowed out powder coating is exposed to about 400 to about 1600 millijoules of radiation energy. The thickness of the cured powder coating layer 20 is about 0.5 mils to about 25 mils in one embodiment, and in another embodiment from about 0.5 mils to about 12 mils.

Outer film 20 formed from the radiation curable powder coating provides increased stain resistance, chemical resistance, and wear resistance of decorative layer 14, and permits the coating of the edges of flat panels and sheets. Also outer film 20 enhances the appearance of decorative overlay 14.

The above described method provides for the fabrication of decorative wood article 10 that includes decorative overlay 14 and that utilizes a UV and/or electron beam radiation curable powder coating. The UV curable powder coating produces virtually no VOC emissions during the application and curing process. The powder coating application and curing steps do not degrade wood substrate 12 nor decorative overlay 14.

While the invention has been described in terms of various specific embodiments, those skilled in the art will recognize that the invention can be practiced with modification within the spirit and scope of the claims.

What is claimed is:

1. A method of fabricating a decorative wood article, said method comprising the steps of:
    applying a decorative overlay onto at least one surface of a wood article, the decorative overlay having a top surface and comprising at least one of paper, wood veneer, vinyl, ink, foil and heat transfer foil;
    applying a radiation curable powder coating onto the outer surface of the overlay;
    heating the applied radiation curable powder coating at a temperature sufficient to melt and flow the applied powder coating; and
    exposing the powder coating to radiation energy to cure the powder coating and form a film on the top surface of the decorative overlay.

2. A method in accordance with claim 1 further comprising the step of heating the wood article prior to applying the powder coating.

3. A method in accordance with claim 1 wherein heating the applied radiation curable powder coating comprises the step of heating the applied radiation curable powder coating at about 150° F. to about 250° F. to melt and flow the powder coating.

4. A method in accordance with claim 2 wherein heating the wood article prior to applying the powder coating comprises the step of heating the wood article to at about 140° F. to about 170° F. prior to applying the powder coat.

5. A method in accordance with claim 1 wherein the wood article comprises wood, particleboard, fiberboard, or medium density fiberboard.

6. A method in accordance with claim 1 wherein applying a radiation curable powder coating comprises the step of applying a radiation curable powder coating by an electrostatic application method onto the outer surface of the decorative overlay.

7. A method in accordance with claim 1 wherein the cured powder coating film has a dry film thickness of about 0.5 mils to about 25 mils.

8. A method in accordance with claim 1 wherein the cured powder coating film has a dry film thickness of about 1.0 mils to about 10 mils.

9. A method in accordance with claim 1 wherein exposing the powder coating to radiation energy comprises exposing the powder coating to at least one of UV light and electron beam radiation.

10. A decorative wood article fabricated by a process comprising:
    applying a decorative overlay onto at least one surface of a wood article, the decorative overlay having an outer surface and comprising at least one of paper, wood veneer, vinyl, ink, foil and heat transfer foil;
    applying a radiation curable powder coating onto the outer surface of the overlay;
    heating the applied radiation curable powder coating at a temperature sufficient to melt and flow the applied radiation curable powder coating; and
    exposing the applied powder coating to radiation energy to cure the powder coating and form a film on the outer surface of the decorative overlay.

11. A decorative wood article in accordance with claim 10 wherein the process further comprises heating the wood article prior to applying the powder coating.

12. A decorative wood article in accordance with claim 10 wherein heating the applied radiation curable powder coating comprises heating the applied radiation curable powder coating at about 150° F. to about 250° F. to melt and flow the powder coating.

13. A decorative wood article in accordance with claim 11 wherein heating the wood article prior to applying the powder coating comprises heating the wood article to at about 140° F. to about 170° F. prior to applying the powder coat.

14. A decorative wood article in accordance with claim 10 wherein the wood article comprises wood, particleboard, fiberboard, or medium densityfiber board.

15. A decorative wood article in accordance with claim 10 wherein applying a radiation curable powder coating comprises applying a radiation curable powder coating by an electrostatic application method onto the outer surface of the decorative overlay.

16. A decorative wood article in accordance with claim 10 wherein the cured powder coating film has a dry film thickness of about 0.5 mils to about 25 mils.

17. A decorative wood article in accordance with claim 10 wherein the cured powder coating film has a dry film thickness of about 1.0 mils to about 10 mils.

18. A decorative wood article in accordance with claim 10 wherein exposing the powder coating to radiation energy comprises exposing the powder coating to at least one of UV light and electron beam radiation.

* * * * *